United States Patent
Gleim

[11] Patent Number: 5,976,671
[45] Date of Patent: Nov. 2, 1999

[54] POLYVINYLIDENE FLUORIDE-BASED DECORATIVE LAMINATE

[75] Inventor: Douglas Wayne Gleim, Lynnwood, Wash.

[73] Assignee: The Boeing Company, Seattle, Wash.

[21] Appl. No.: 08/954,209

[22] Filed: Oct. 20, 1997

[51] Int. Cl.⁶ .............................. B32B 27/08; B32B 27/32
[52] U.S. Cl. ..................... 428/172; 428/421; 428/463; 428/542.2; 428/174
[58] Field of Search ...................... 428/172, 174, 428/421, 463, 542.2, 141, 143, 187, 207, 354, 520

[56] References Cited

U.S. PATENT DOCUMENTS

| | | |
|---|---|---|
| 3,616,192 | 10/1971 | Sinclair . |
| 3,869,326 | 3/1975 | Matzke . |
| 3,946,137 | 3/1976 | Power et al. . |
| 4,465,728 | 8/1984 | Haigh et al. . |
| 4,693,926 | 9/1987 | Kowalski et al. . |
| 4,788,091 | 11/1988 | Rossitto et al. . |
| 4,877,683 | 10/1989 | Bragaw, Jr. et al. . |
| 4,988,540 | 1/1991 | Bragaw, Jr. et al. . |
| 5,085,921 | 2/1992 | Jayarajan . |
| 5,203,941 | 4/1993 | Spain et al. . |
| 5,238,725 | 8/1993 | Effing et al. . |
| 5,518,786 | 5/1996 | Johnson et al. . |

Primary Examiner—Donald Loney
Attorney, Agent, or Firm—Christensen O'Connor Johnson & Kindness PLLC

[57] ABSTRACT

The decorative laminate formed in accordance with the present invention is a flexible, organic polymer-based laminate that overcomes the disadvantages of conventional laminates that include thermosetting emboss resins for imparting texture to the laminate. The laminate formed in accordance with the present invention includes a polyvinylidene fluoride-based material that serves to receive and retain texture or surface relief, and also to impart further decorative features to the laminate.

31 Claims, 4 Drawing Sheets

POLYVINYLIDENE FLUORIDE-BASED DECORATIVE LAMINATE

FIELD OF THE INVENTION

The present invention generally relates to a decorative laminate and, more particularly, to a polyvinylidene fluoride-based decorative laminate.

BACKGROUND OF THE INVENTION

Commercial aircraft interiors are generally composed of composite panels decorated with plastic decorative laminates. Preferred decorative laminates have exterior surfaces that are textured and exhibit surface relief. Decorated interior panels are typically formed by heating and then stretching a plastic decorative laminate onto the panel. While textured panels generally retain their surface relief when formed onto smooth and relatively simple contoured panels, significant loss of texture occurs for conventional plastic laminates when they are formed onto compound contoured panels, or when they are formed at higher temperatures and/or under vacuum.

Textured decorative laminates generally include at least two layers; a first embossed layer that imparts surface relief to the laminate and a second decorative layer that overlies the first. The decorative layer is typically either screen printed (i.e., multigraphics) or integrally colored (i.e., internally pigmented).

A laminate construction having a first embossed layer and a second decorative layer is commonly referred to as a single decorative laminate. Generally, the single laminate includes a textured layer consisting of a thermosetting emboss resin (e.g., a 3 mil thick layer of a polyurethane-phenoxy emboss resin) overlaid with a decorative layer composed of a thin layer of pigmented thermoplastic film (e.g., a polyvinyl fluoride film, such as Tedlar®, having a thickness of about 2 mil). A second decorative laminate, commonly referred to as a double decorative laminate, is a laminate construction that includes, in addition to an embossed layer and a decorative layer, a structural layer (e.g., a thermoplastic resinous layer). A typical double decorative laminate includes two thermoplastic layers, an outer decorative layer and an inner structural layer, with an emboss resin layer positioned in between. These decorative laminates are generally prepared by collating sheets of the component plastic materials followed by simultaneously laminating and embossing in a hot press process.

Surface relief or texture is ordinarily imparted to the laminate by a hot press process. During the press cycle, the laminate's thermosetting emboss resin is "molded" by the texture media (i.e., the textured press). The emboss resin is said to be molded because shear flow occurs within the thermosetting resinous material resulting in the layer's cross-sectional thickness variation, i.e., the creation of an embossed or textured surface. The hot press also "forms" the decorative layer. The decorative thermoplastic layer or film is said to be formed because its viscosity is too high for shear flow to occur, and thus cannot be molded and, although the film does stretch during forming onto the textured layer, the decorative film remains relatively uniform in thickness. Furthermore, the heat and length of the hot press cycle result in emboss resin curing or crosslinking, which effectively raises the emboss layer's viscosity and counteracts the residual stresses of the thermoplastic film layer during forming. The crosslinked emboss resin provides for texture retention in subsequent application processes in which the decorative laminate is heated and vacuum formed onto composite panels. However, in some instances, texture inversion can occur as a result of the relatively greater elastic modulus of the decorative thermoplastic layer compared to the textured thermosetting emboss layer.

The conventional thermoset resin-containing decorative laminate constructions described above suffer from several disadvantages including loss of texture retention when the laminate in heated and formed onto a composite panel. For example, single decorative laminates perform poorly when they are elongated more than about 5%, and double decorative laminates begin to lose texture at about 10% elongation. Furthermore, because of the presence of the thermosetting emboss resin, these decorative laminates can only be practically produced in press processes, which are economically disadvantageous for the production of large quantities of laminate.

Accordingly, a need exists for economically produced decorative laminates that retain texture or surface relief when the laminate is heated and formed onto a panel that requires substantial forming or stretching.

There also exists the need for decorative laminates that can be produced by methods other than hot press processes. Because the emboss resin is a thermosetting resin, sufficient time (e.g., from 15 to 30 minutes) above a specific cure or thermoset temperature (e.g., 285° F.) is required to soften and "wet out" the thermoplastic's surface with the thermoset resin for bonding; for shear flow and accommodation of the texture media; and to cure (i.e., crosslink) the thermoset resin for texture retention. Single decorative laminates are generally difficult to roll process because of the misbalance of the elastic modulus of the thermosetting emboss resin and the thermoplastic layer.

A need also exists to overcome the disadvantageous surface properties associated with some pigmented thermoplastic decorative layers. For example, the surface of pigmented polyvinyl fluoride, a common decorative layer, is disrupted by pigment particles that protrude from the material's surface. Because these particles are generally inorganic oxides, the particles are harder than most materials, including metals, that contact the surface. Thus, when metal objects (e.g., jewelry, buckles, coins) rub against this surface with sufficient force, metal is ablated and left on the surface as a dark streak. This phenomena is commonly referred to as "coining." These metallic streaks are difficult to clean because the residual metals are typically not affected by cleaners ordinarily used for cleaning plastic surfaces, and therefore must be abraded from the decorative surface. The pigment particles may also absorb or adsorb other chemicals leaving stains that are also difficult to clean. While it may be possible to force the particles back into the polymer matrix during embossing with heat and pressure, the relatively inelastic nature of the polyvinyl fluoride material requires relatively harsh conditions.

The present invention seeks to provide a decorative laminate that overcomes the difficulties noted above, and provides a decorative laminate that is characterized as having high texture retention when stretched or formed on a composite panel, is readily formed by economical processes, and yet is soft enough so as not to suffer from disadvantageous surface properties.

SUMMARY OF THE INVENTION

The decorative laminate formed in accordance with the present invention is a flexible, organic polymer-based laminate that overcomes the disadvantages of conventional laminates that include thermosetting emboss resins for imparting texture to the laminate. The flexible laminate formed in accordance with the present invention includes a polyvinylidene fluoride-based material that serves to receive and retain texture or surface relief, and also to impart further decorative features to the laminate.

The polyvinylidene fluoride layer is moldable in the press process, has no memory, and eliminates the necessity of the thermosetting emboss resin present in conventional laminates. By replacing the thermosetting emboss resin, laminate forming processes generally have shorter press cycles, which results in significant cost savings. Because the polyvinylidene fluoride layer is a thermoplastic, in contrast to the thermosetting emboss resin, the laminate can be continuously roll embossed in processes that provide further savings in labor costs and decorative laminate wastes in vacuum forming. In addition, a reduction in laminate weight, a critical factor in aircraft component considerations, is also achieved. Furthermore, because the textured, polyvinylidene fluoride layer is not a high modulus elastic, the laminate's texture does not invert under the tension of vacuum forming and provides for high texture retention even for greatly stretched or elongated parts. Finally, because the polyvinylidene fluoride material is relatively soft, pigmented polyvinylidene fluoride materials offer the advantage that the pigment particles can be pushed below the surface of the polymer layer or capped with a clear layer, thus eliminating the coining problem.

The flexible, organic polymer-based laminate formed in accordance with the present invention generally includes a structural or backing layer made from a thermoplastic material and a textured layer composed of a polyvinylidene fluoride-based material. The laminate's textured layer is affixed to the structural layer by an intermediate layer that includes an adhesive material.

In another embodiment, the laminate of the present invention includes a metal foil layer positioned between the structural and textured layers. In a preferred embodiment, the metal foil is an aluminum foil.

The laminate of the present invention may further include an adhesive layer for affixing the laminate to a substrate. In preferred embodiments, the adhesive layer is a heat-activatable or pressure-sensitive adhesive layer. The laminates of the present invention can also include a printed layer that overlies the textured layer.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 1 illustrates conventional decorative laminates.

DETAILED DESCRIPTION OF THE PREFERRED EMBODIMENT

The present invention is generally directed to a decorative laminate and, more particularly, to a flexible, organic polymer-based decorative laminate. The decorative laminate formed in accordance with the present invention can be formed onto a composite panel with the retention of texture to provide a decorative panel. The decorative panel is particularly well suited as a component for commercial aircraft interiors. The laminate formed in accordance with the present invention includes a textured layer attached to a structural layer through a layer that contains an adhesive material. The textured layer includes an outer textured surface. The laminate possesses the advantageous property of texture retention, which enables the laminate to be formed onto a composite panel to provide a textured, decorative panel without substantial loss of the laminate's surface relief.

Figure 1A:
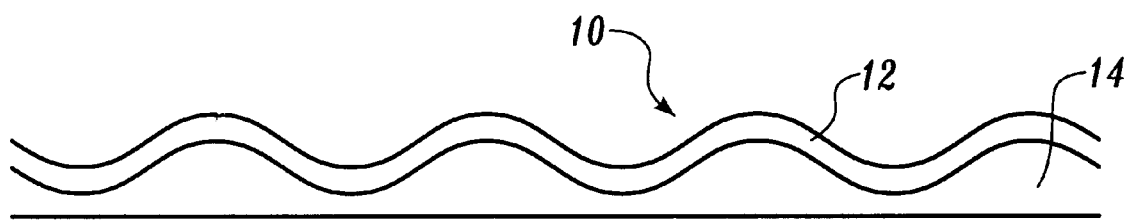
FIG. 1A illustrates a single decorative laminate.
Figure 1B:
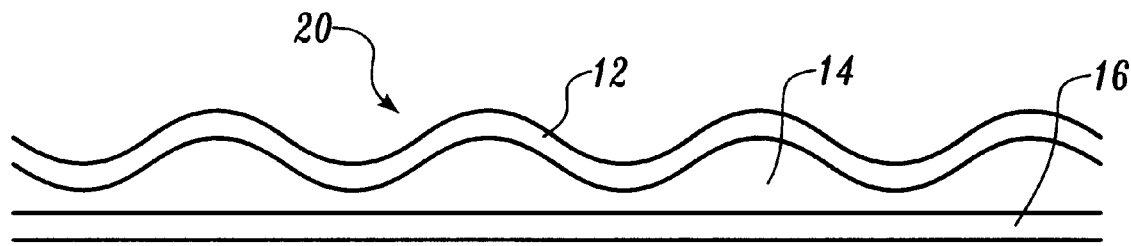
FIG. 1B illustrates a double decorative laminate.

Decorative laminates are known in the art and representative laminates are illustrated in FIG. 1. Referring to FIG. 1A, single decorative laminate 10 includes decorative layer 12 that overlies emboss layer 14. A double decorative laminate 20 having structural layer 16, in addition to decorative layer 12 and emboss layer 14 is illustrated in FIG. 1B. Emboss layer 14 is composed of a thermosetting resin, for example, a polyurethane-phenoxy emboss resin, which is molded by the texture media in the hot press cycle during the laminate's construction. Through the application of heat and pressure by the hot press, the thermosetting resin is cured and takes on the texture or surface relief of the texture media (i.e., the texture of the press face plate). During the hot press cycle, decorative layer 12, which is composed of a thermoplastic resinous material, is formed by the texture media and remains substantially uniform in thickness. Generally, the decorative laminates described above retain their texture when applied to flat or simple contoured panels and formed at fairly low temperatures and requiring little, if any, forming or stretching. However, application of these laminates to compound contour panels generally requires higher forming temperatures, which results in considerable laminate stretching or elongation.

In contrast to the decorative laminates described above, the laminate formed in accordance with the present invention does not include a thermosetting resinous plastic to provide texture to the laminate. Rather, the decorative laminate of this invention includes a polyvinylidene fluoride-based layer that serves to receive and retain texture and further serves as a decorative layer that can be pigmented and/or receive printed graphics. Conventional decorative laminates accomplish the dual function of texture and decor through a dual-layer construction; namely, a first thermosetting embossable resinous layer for receiving laminate texture and a second thermoplastic decorative layer for receiving printed graphics and/or for imparting color to the laminate.

The laminate of the present invention is a flexible, organic polymer-based laminate that retains texture when heated and formed onto composite panels. The laminate is primarily composed of organic polymeric materials and, because of safety considerations associated with commercial aircraft, a primary utility of the decorative laminates of this invention, the organic polymers are preferably flame resistant fluorinated organic polymers.

Figure 2:
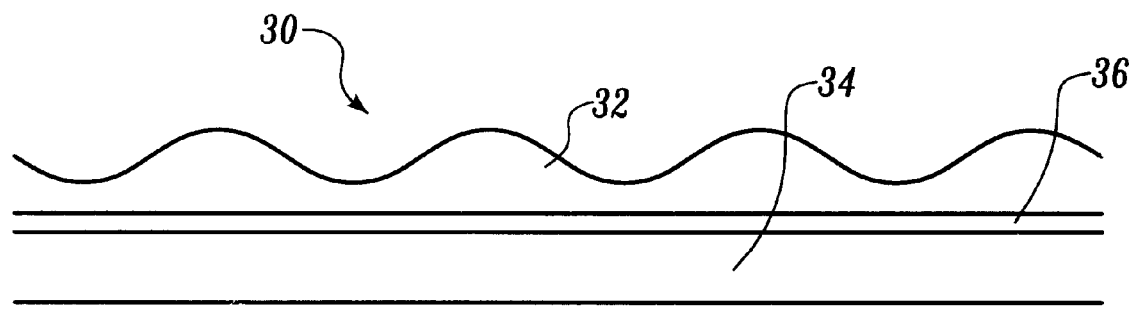
FIG. 2 illustrates a decorative laminate formed in accordance with the present invention.

Referring to FIG. 2, representative decorative laminate 30 includes a textured layer 32 having a textured outer surface, indicated by the wavy line in the figure, structural layer 34, and layer 36 that contains an adhesive material, positioned between layers 32 and 34, that affixes the textured layer to the structural layer.

Textured layer 32 is composed of a melt processable, thermoplastic material that has no memory such that, when the material is exposed to heat and a texture media, the layer adopts texture imparted by the texture media, which is retained on cooling. The textured layer includes, as a principal component, a thermoplastic fluorinated organic polymer. Preferably, the fluorinated polymer is a fluorocarbon such as a polyvinylidene fluoride-based material. As used herein, the term "polyvinylidene fluoride-based material" refers to a thermoplastic polymeric material that is capable of texture retention and includes a polyvinylidene fluoride polymer (i.e., a polymer formed from vinylidene fluoride). The fluorinated polymer is generally a polymer, copolymer, or terpolymer of vinylidene fluoride. In a preferred embodiment, the thermoplastic fluorocarbon is the polyvinylidene fluoride (PVDF) commercially available under the designation Kynar®, a trademark of Elf Atochem.

In addition to PVDF, the textured layer can also include acrylic, polyurethane, flame retardants, and pigments.

Preferably, the textured layer includes an organic polymer that is melt processable below about 340° F., and more preferably at about 320° F. Because PVDF is melt-processable from 300° F. to 600° F., PVDF-based layers can be readily embossed in a press process at 320° F. Suitable PVDF-based materials include PVDF polymer films having thicknesses ranging from about 1 mil to about 5 mil. In a preferred embodiment, the PVDF-based material is 2.5 mil thick Avimark Kynar® film commercially available from Avery Dennison (Schererville, Ind.).

The textured PVDF-based layer can be clear and colorless or, alternatively, can be colored and include pigmented particles. Because of the melt processable nature of PVDF, pigmented particles contained within a PVDF-based layer can be readily pushed below the surface of the textured layer during the press processing, thereby eliminating any coining problem. The coining problem can also be eliminated by capping the pigmented layer with a thin colorless layer.

The decorative laminate formed in accordance with the present invention includes a structural layer composed of a thermoplastic material. Generally, the thermoplastic material includes a thermoplastic fluorinated organic polymer, preferably a fluorocarbon such as polyvinyl fluoride (PVF) or PVDF. Preferably, the fluorocarbon is a polyvinyl fluoride-based material. As used herein, the term "polyvinyl fluoride-based material" refers to a polyvinyl fluoride polymer (i.e., a polymer formed from vinyl fluoride). The fluorinated polymer is generally a polymer, copolymer, or terpolymer of vinyl fluoride. A thermoplastic fluorocarbon useful in the structural layer is the polyvinyl fluoride commercially available under the designation Tedlar®, a trademark of E.I. DuPont de Nemours & Co., Wilmington, Del. In a preferred embodiment, the structural layer is a 2.0 mil thick TEB20BE5 Tedlar® film.

A layer containing an adhesive material affixes the textured layer to the structural layer. Referring again to FIG. 2, textured layer 32 is affixed to structural layer 34 by adhesive material-containing layer 36. Layer 36 can include any adhesive material suitable for affixing the textured layer to the structural layer. Suitable adhesive materials include thermoplastic and thermosetting adhesive materials such as acrylic and polyurethane adhesive materials. In a preferred embodiment, the adhesive material is an acrylic adhesive having a thickness of about 0.2 mils, commercially available from DuPont under the designation 68080 or 68040 acrylic adhesive.

Figure 3:
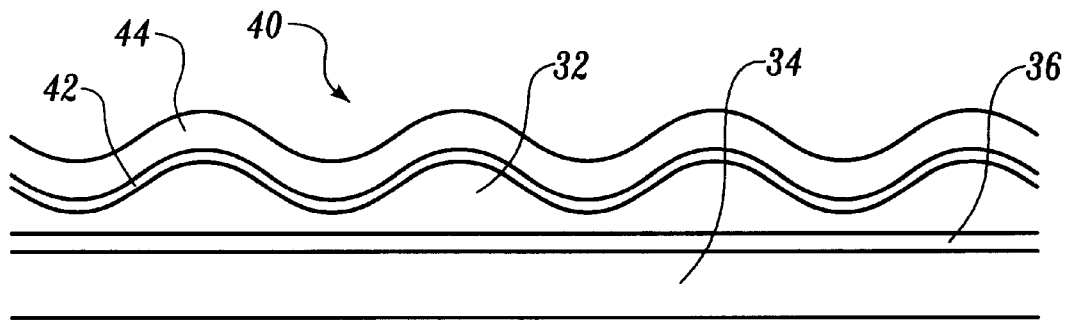
FIG. 3 illustrates a printed decorative laminate formed in accordance with the present invention.

The decorative laminates of the present invention include printed laminate constructions. A representative printed laminate of the present invention is illustrated in FIG. 3. Referring to FIG. 3, printed laminate 40 includes, in addition to textured layer 32, structural layer 34, and adhesive-containing layer 36, printed layer 42 and capping layer 44. Printed layer 42 can include ink or toner that is deposited on textured layer 32 by screen, electrostatic transfer, ink jet, and gravure processes, among others. Capping layer 44 provides protection to the ink layer, and preferably requires no adhesive for bonding to the printed laminate. Preferred capping layers include thermoplastic fluorinated polymer films such as PVF and PVDF films. The capping layer preferably has a thickness from about 0.4 mil to about 1.0 mil and is made of clear PVDF film such as is commercially available from Avery Dennison under the designations Avimark C40 and C70.

Figure 4:
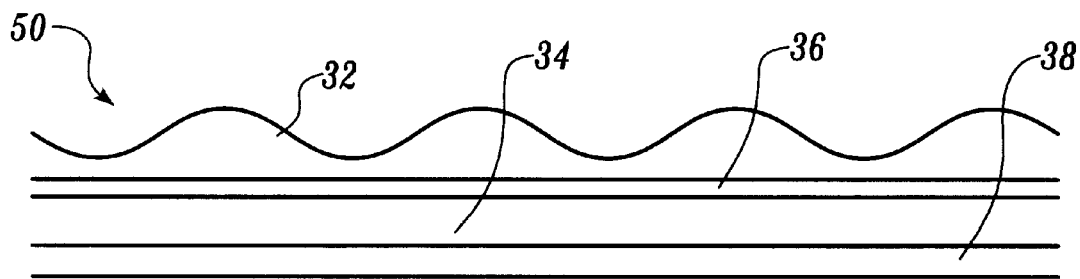
FIG. 4 illustrates a decorative laminate having an adhesive layer formed in accordance with the present invention.

As noted above the decorative laminates of this invention are formed onto composite panels that are useful in commercial aircraft interiors. Thus, in another embodiment, the laminate formed in accordance with the present invention includes an adhesive layer for affixing the laminate to a substrate, such as a structural panel of an aircraft interior. A representative laminate formed in accordance with the present invention and having an adhesive layer is illustrated in FIG. 4. Referring to FIG. 4, decorative laminate 50 includes, in addition to textured layer 32, structural layer 34, and adhesive-containing layer 36, adhesive layer 38 adjacent structural layer 36 for affixing laminate 50 to a substrate. Suitable adhesive layers include pressure-sensitive and heat-activatable adhesive layers.

The pressure-sensitive adhesive layer can be preapplied to the laminate as a film or coating. Suitable pressure-sensitive adhesives include, for example, a 3–6 mil thick adhesive available from the 3M Company (Knoxville, Iowa) under the designation 468MPF. In a preferred embodiment, the pressure-sensitive adhesive is a 3 mil thick adhesive available from Bostik Inc. (Middleton, Mass.) under the designation S408-4084.

Alternatively, the decorative laminate can be applied to a substrate by a heat-activatable adhesive. Preferred heat-activated adhesives include thermosetting and thermoplastic adhesives. Thermosetting adhesives can be combined with a solvent and applied to the panel by spraying. The laminate can then be affixed to the panel by vacuum-forming the laminate onto the panel, followed by heating to cure the adhesive and fix the laminate to the panel. In a preferred embodiment, the heat-activatable adhesive is a thermoplastic adhesive, which can be applied to a structural panel by heating and which, for repair or refurbishment, can also be stripped from the panel by heating. A preferred reversibly affixable heat-activatable adhesive is a 1.5 mil thick film available from Bostik under the designation 10-309-1.5. The heat-activatable adhesive can be hot laminated to structural layer 34 to provide adhesive layer 38 as indicated in FIG. 4.

Figure 5:
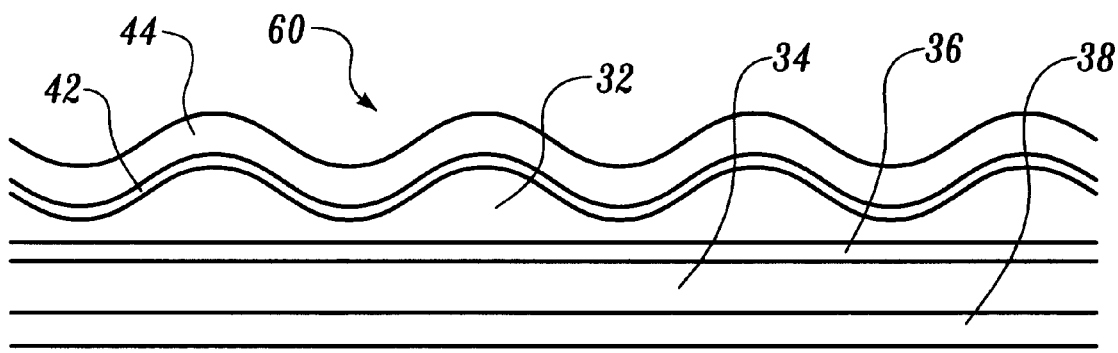
FIG. 5 illustrates a printed decorative laminate having an adhesive layer formed in accordance with the present invention.

Printed decorative laminate 40 (see FIG. 3) can also include an adhesive layer 38 for affixing the laminate to a substrate or structural panel. A representative printed decorative laminate having an adhesive layer for affixing the laminate to a substrate is indicated by reference numeral 60 in FIG. 5.

In general, the flexible, decorative laminates of the present invention can be formed by collating the materials described above and then simultaneously laminating and embossing (i.e., imparting texture thereto) in a hot press process. Alternatively, the laminates of this invention can be formed by a thermoplastic embossing process as described by Pasquale in *Web Processing and Converting Technology and Equipment,* Van Nostrand Reinhold, Inc., 1984.

The decorative laminate of the present invention retains its texture when stretched. Generally, the laminate retains at least about 70%, preferably about 80%, of its texture when its area is increased by stretching by at least about 10%. A method for determining texture retention is described in Example 1. Texture retention performance of a representative decorative laminate formed in accordance with the present invention is compared to a conventional laminate in Example 1. The texture retention of the representative PVDF-based decorative laminate was determined to be significantly greater than for a conventional laminate. Increasing the area of the laminate by 25% resulted in a texture retention value of 80% for the PVDF-based laminate, while the conventional laminate lost about half of its texture when similarly stretched. Furthermore, in addition to texture retention, the PVDF-based laminate was found to be more formable than the conventional laminate, which could not be stretched to increase its area by 30% in a vacuum forming operation. Presumably the laminate could stretch more, but under the same pressure (about 0.8 atmosphere), the PVDF laminate forms more. Accordingly, these results demonstrate that PVDF-based laminates are well suited for forming onto compound contoured panels while at the same time retaining their surface texture.

The flexible, decorative laminate formed in accordance with the present invention can also include a metal foil layer. The metal foil layer is incorporated into the laminate at least in part to retard heat release from the laminate in the event of laminate combustion. In a preferred embodiment, the metal foil is an aluminum foil.

Figure 6:
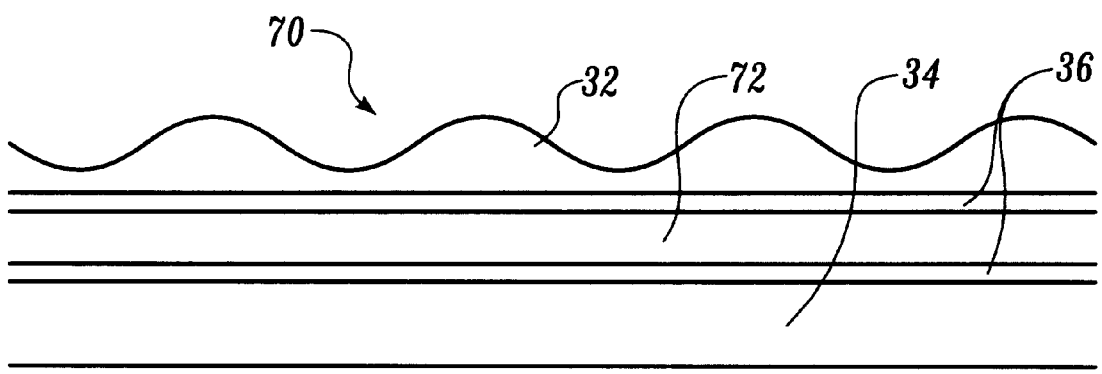
FIG. 6 illustrates a decorative laminate having a metal foil layer formed in accordance with the present invention.

A representative decorative laminate having a metal foil layer is illustrated in FIG. 6. Referring to FIG. 6, laminate 70 includes textured layer 32, structural layer 34, metal foil layer 72, and adhesive-containing layers 36. Metal foil layer 72 is positioned between textured layer 32 and structural layer 34 and affixed to these layers by adhesive-containing layers 36.

Figure 7:
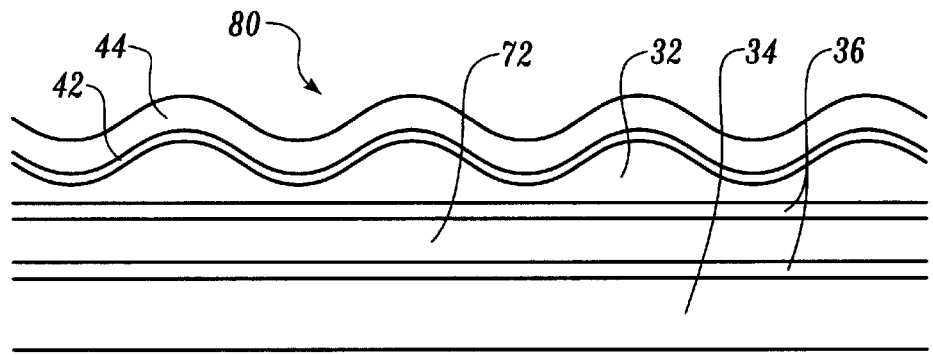
FIG. 7 illustrates a printed decorative laminate having a metal foil layer formed in accordance with the present invention.
Figure 8:
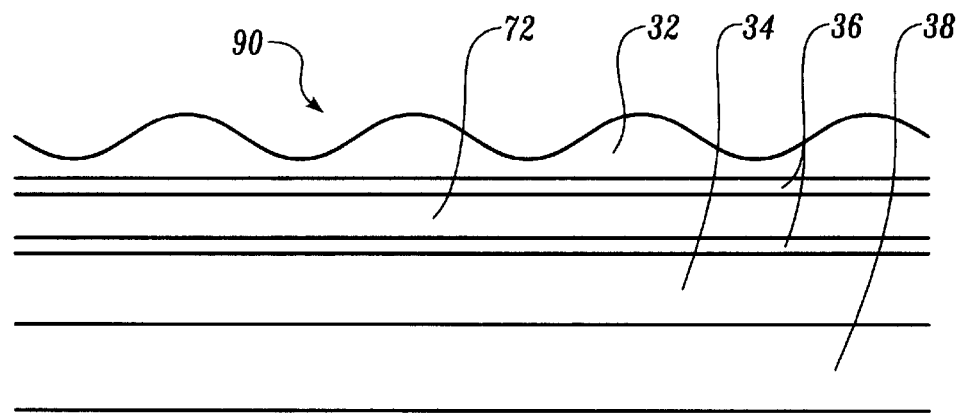
FIG. 8 illustrates a decorative laminate having a metal foil layer and an adhesive layer formed in accordance with the present invention.
Figure 9:
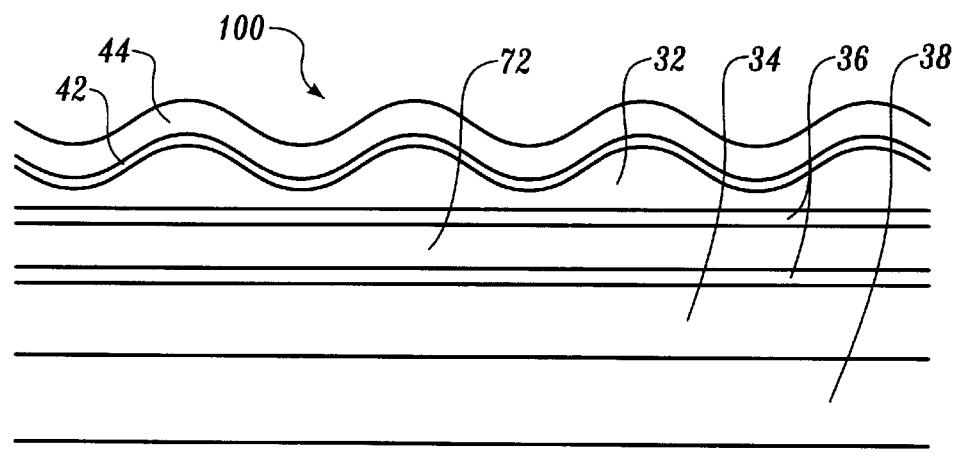
FIG. 9 illustrates a printed decorative laminate having a metal layer and an adhesive layer formed in accordance with the present invention.

As for the other decorative laminates described above, the laminates of the present invention that include metal foil layers can also include printed layers and/or adhesive layers for affixing the laminate to a substrate or structural panel. Referring to FIG. 7, printed laminate 80 includes textured layer 32, structural layer 34, metal foil layer 72, adhesive-containing layers 36, printed layer 42, and capping layer 44. Referring to FIG. 8, decorative laminate 90 includes textured layer 32, structural layer 34, metal foil layer 72, adhesive-containing layers 36, and adhesive layer 38 for affixing the decorative laminate to a substrate. Decorative laminate 100 illustrated in FIG. 9 combines the features of laminates 80 and 90 and provides a printed decorative laminate that includes a metal foil and that further has an adhesive layer for affixing the laminate to a substrate.

Another advantage of the decorative laminate of the present invention relates to its relatively low weight compared to conventional laminates containing thermoset resins. As indicated in Table 2 in Example 2 below, a representative decorative laminate formed in accordance with the present invention weighs about 33% less than a similar conventional laminate. Such a weight difference is the realization of a significant economic advantage for commercial aircraft that include such laminates.

The use of the laminates of this invention in commercial aircraft interior components imposes certain safety criteria on the materials used in the laminate's construction. As noted above, the decorative laminate is composed primarily of fluorinated organic polymers, which are, in general, flame resistant. In addition, embodiments of the laminate that include a metal foil layer have retarded heat release compared to laminates that lack such a foil layer. The Federal Aviation Administration (FAA) has required that materials used in aircraft interior construction pass certain flammability, heat release, and smoke emission tests. See Title 14 of the Code of Federal Regulations, Part 25, Appendix F, Part I: Test Criteria and Procedures; Part IV: Test Method to Determine Heat Release Rate; and Part V: Test Method to Determine Smoke Emission. Generally, aircraft interior panels must be self-extinguishing when tested vertically in accordance with the applicable portions of Part I of Appendix F. With regard to heat release, total heat release of a material must not exceed 65 kW-min/m$^2$ and the peak heat release rate must not exceed 65 kW/m$^2$. With regard to the smoke emission characteristics, the specific optical smoke density ($D_S$) must not exceed 200. Referring to Table 2 in Example 2 below, the decorative laminates of the present invention fall well within the requirements set forth by the FAA and also generally outperform conventional decorative laminates.

The following examples are provided for the purposes of illustration, not limitation.

EXAMPLES

Example 1

Texture Retention for a Representative PVDF-Based Laminate and a Conventional Thermosetting Resin-Containing Laminate In this example, the texture retention performance of a representative decorative laminate formed in accordance with the present invention is compared to a conventional decorative laminate. The PVDF-based laminate tested was composed of a PVDF-based textured layer (Kynar®) affixed to a PVF-based structural layer (Tedlar®) with an acrylic adhesive (DuPont 68080). The conventional laminate was composed of a pigmented PVF-based (Tedlar®) decorative layer bonded to a textured emboss resin layer (polyurethane-phenoxy resin, Bostik 10-669-3) overlying a pigmented PVF-based (Tedlar®) structural layer. In the experiment, each laminate sample was omnidirectionally stretched at 300° F. to increase the laminate's area by 15, 20, 25, and 35%, respectively. Following stretching, the average maximum peak to valley height (reported as Rz) in mil of five consecutive sampling lengths within the measuring length was measured. Texture retention was determined by dividing the average maximum peak to valley height by the maximum peak to valley height in the unstretched laminate and then multiplying by 100%. The results are tabulated in Table 1 below.

TABLE 1

Texture Retention Performance

| % Area Increase | PVDF-Based Decorative Laminate | | Conventional Decorative Laminate | |
|---|---|---|---|---|
| | Rz (mil) | Retention | Rz (mil) | Retention |
| 0% | 4.4 | — | 4.4 | — |
| 15% | 3.6 | 82% | 2.7 | 61% |
| 20% | 3.5 | 80% | 2.2 | 50% |
| 25% | 3.5 | 80% | 2.2 | 50% |
| 30% | 3.5 | 80% | NA | NA |

The results demonstrate that the PVDF-based decorative laminate of this invention significantly retains texture when heated and stretched. Referring to Table 1, increasing the area of the laminate by 25% resulted in a texture retention value of 80% for the PVDF-based laminate, while the conventional laminate lost about 50% of its texture. Furthermore, in addition to texture retention, the PVDF-based laminate was determined to be significantly more flexible than the conventional laminate, which could not be stretched to increase its area by 30% (reported as NA in Table 1 above).

Example 2

Characteristic Properties of a Representative PVDF-Based Laminate and a Conventional Thermoset Resin-Containing Laminate In this example, some characteristic properties of a representative decorative laminate formed in accordance with the present invention are compared to a conventional thermoset resin-containing laminate. The PVDF-based laminate tested was composed of a printed PVDF-based textured layer (Kynar®) affixed to a PVF-based structural layer (Tedlar®) with an acrylic adhesive (DuPont 68080). The conventional laminate was composed of a printed PVF-based (Tedlar®) decorative layer bonded to a textured emboss resin layer (polyurethane-phenoxy resin, Bostik 10-669-3) overlying a pigmented PVF-based (Tedlar®) structural layer. In the experiment, each laminate sample was tested as described in the pertinent section of the Title 14 of the Code of Federal Regulations as indicated below. The results are summarized in Table 2 below.

TABLE 2

Characteristic Properties of Representative Laminates

| | Conventional Decorative Laminate | PVDF-Based Decorative Laminate |
|---|---|---|
| Decorative Laminate Construction | Tedlar ®-Emboss Resin-Tedlar ® (Double) Decorative Laminate | Tedlar ®-Kynar ® Decorative Laminate |
| Area Weight | 0.064 lbs/ft$^2$ | 0.044 lbs/ft$^2$ |
| Flammability[1] | Self Extinguishing | Self Extinguishing |
| Total Heat Release[2] | 28 kW min/m$^2$ | 20 kW min/m$^2$ |
| Peak Heat Release[3] | 59 kW/m$^2$ | 45 kW/m$^2$ |
| Smoke Emission[4] | 57 D$_s$ | 19 D$_s$ |

[1] Measured per Code of Federal Regulations, Part 25, Appendix F part 1, 60 second vertical test.
[2,3] Measured per Code of Federal Regulations, Part 25, Appendix F part IV.
[4] Measured per Code of Federal Regulations, Part 25, Appendix F part V.

The results demonstrate that the PVDF-based decorative laminate of this invention outperforms conventional laminates in total heat release, peak heat release, and smoke emission testing.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A flexible, organic polymer-based laminate sequentially comprising:
   (a) a first layer comprising a polyvinyl fluoride-based material;
   (b) a second layer comprising an adhesive material; and
   (c) a third layer having a textured outer surface, the layer comprising a polyvinylidene fluoride-based material.

2. The laminate of claim 1 wherein the polyvinyl fluoride-based material is selected from the group consisting of polymers, copolymers, and terpolymers of vinyl fluoride.

3. The laminate of claim 1 wherein the polyvinylidene fluoride-based material is selected from the group consisting of polymers, copolymers, and terpolymers of vinylidene fluoride.

4. The laminate of claim 1 wherein the adhesive material comprises an acrylic adhesive.

5. The laminate of claim 1 wherein the third layer is pigmented.

6. The laminate of claim 1 wherein the third layer is not marred by coining.

7. The laminate of claim 1 having a texture retention value of at least about 70% when omnidirectionally stretched at 300° F. increasing its surface area by at least about 30%.

8. The laminate of claim 1 further comprising an adhesive layer for affixing the laminate to a substrate.

9. The laminate of claim 8 wherein the adhesive layer is selected from a heat-activatable adhesive layer and a pressure-sensitive adhesive layer.

10. The laminate of claim 8 wherein the substrate comprises a portion of an aircraft interior.

11. The laminate of claim 1 further comprising a printed layer overlying the third layer and a capping layer overlying the printed layer.

12. The laminate of claim 11 wherein the printed layer is formed by a process selected from screen, electrostatic transfer, inkjet, and gravure processes.

13. The laminate of claim 11 wherein the capping layer comprises a polyvinylidene fluoride-based material.

14. The laminate of claim 11 further comprising an adhesive layer for affixing the laminate to a substrate.

15. The laminate of claim 14 wherein the adhesive layer is selected from a heat-activatable adhesive layer and a pressure-sensitive adhesive layer.

16. The laminate of claim 14 wherein the substrate comprises a portion of an aircraft interior.

17. A flexible, organic polymer-based laminate sequentially comprising:
   (a) a first layer comprising a polyvinyl fluoride-based material;
   (b) a second layer comprising an adhesive material;
   (c) a third layer comprising a metal foil;
   (d) a fourth layer comprising an adhesive material; and
   (e) a fifth layer having a textured outer surface, the layer comprising a polyvinylidene fluoride-based material.

18. The laminate of claim 17 wherein the metal foil layer comprises aluminum foil.

19. The laminate of claim 17 further comprising an adhesive layer for affixing the laminate to a substrate.

20. The laminate of claim 19 wherein the substrate comprises a portion of an aircraft interior.

21. The laminate of claim 17 further comprising a printed layer overlying the fifth layer and a capping layer overlying the printed layer.

22. The laminate of claim 21 further comprising an adhesive layer for affixing the laminate to a substrate.

23. The laminate of claim 22 wherein the substrate comprises a portion of an aircraft interior.

24. A decorative panel comprising a flexible, organic polymer-based laminate affixed to a substrate, wherein the laminate sequentially comprises:
  (a) a first layer comprising an adhesive layer for affixing the laminate to the substrate;
  (b) a second layer comprising a polyvinyl fluoride-based material;
  (c) a third layer comprising an adhesive material; and
  (d) a fourth layer having a textured outer surface, the layer comprising a polyvinylidene fluoride-based material.

25. The decorative panel of claim 24 wherein the laminate further comprises a printed layer overlying the fourth layer and a capping layer overlying the printed layer.

26. The decorative panel of claim 24 wherein the substrate comprises a portion of an aircraft interior.

27. The decorative panel of claim 24 wherein the laminate is reversibly affixed to the substrate.

28. A decorative panel comprising a flexible, organic polymer-based laminate affixed to a substrate, wherein the laminate sequentially comprises:
  (a) a first layer comprising an adhesive layer for affixing the laminate to the substrate;
  (b) a second layer comprising a polyvinyl fluoride-based material;
  (c) a third layer comprising an adhesive material;
  (d) a fourth layer comprising a metal foil;
  (d) a fifth layer comprising an adhesive material; and
  (e) a sixth layer having a textured outer surface, the layer comprising a polyvinylidene fluoride-based material.

29. The decorative panel of claim 28 wherein the laminate further comprises a printed layer overlying the sixth layer and a capping layer overlying the printed layer.

30. The decorative panel of claim 28 wherein the substrate comprises a portion of an aircraft interior.

31. The decorative panel of claim 28 wherein the laminate is reversibly affixed to the substrate.

* * * * *